(12) United States Patent
Beutler et al.

(10) Patent No.: US 8,585,526 B2
(45) Date of Patent: Nov. 19, 2013

(54) VEHICLE DRIVELINE COMPONENT HAVING HEAT SINK FOR INCREASED HEAT REJECTION CAPABILITIES

(75) Inventors: Kevin R. Beutler, Columbiaville, MI (US); James P. Borowiak, Grand Blanc, MI (US); Gregory J. Hilker, Canton, MI (US); Rajendra D. Patil, Westland, MI (US); Jeffrey E. Rea, Ames, IA (US)

(73) Assignee: American Axle & Manufacturing, Inc., Detroit, MI (US)

( * ) Notice: Subject to any disclaimer, the term of this patent is extended or adjusted under 35 U.S.C. 154(b) by 603 days.

(21) Appl. No.: 12/911,239

(22) Filed: Oct. 25, 2010

(65) Prior Publication Data

US 2011/0082001 A1    Apr. 7, 2011

Related U.S. Application Data

(63) Continuation-in-part of application No. 11/764,444, filed on Jun. 18, 2007, now Pat. No. 7,819,769.

(51) Int. Cl.
*F16H 57/04* (2010.01)

(52) U.S. Cl.
USPC ............................................. 475/161; 74/607

(58) Field of Classification Search
USPC ........................................................ 475/161
See application file for complete search history.

(56) References Cited

U.S. PATENT DOCUMENTS

| | | | |
|---|---|---|---|
| 2,015,108 A | 9/1935 | Harper | |
| 2,199,502 A | 5/1940 | Maddock | |
| 3,138,222 A | 6/1964 | Dames | |
| 3,828,881 A | 8/1974 | Owen | |
| 3,838,751 A | 10/1974 | Brown | |
| 5,297,855 A | 3/1994 | Jeng | |
| 5,839,327 A | 11/1998 | Gage | |
| 6,123,175 A | 9/2000 | Fett | |
| 6,189,413 B1 | 2/2001 | Morse et al. | |
| 6,675,676 B2 | 1/2004 | Beutler | |
| 6,997,284 B1 | 2/2006 | Nahrwold | |
| 7,004,879 B2 | 2/2006 | Beutler | |
| 7,819,769 B2 | 10/2010 | Beutler et al. | |
| 2006/0021463 A1 | 2/2006 | Peterson et al. | |
| 2006/0054411 A1 | 3/2006 | Fett et al. | |
| 2006/0213318 A1 | 9/2006 | Hibbler et al. | |

FOREIGN PATENT DOCUMENTS

| | | |
|---|---|---|
| GB | 1115446 A | 5/1968 |
| JP | 7288949 A | 10/1995 |
| JP | 2001-119810 A | 4/2001 |
| KR | 10-2007-0046268 A | 5/2007 |

OTHER PUBLICATIONS

International Search Report and Written Opinion for International Application No. PCT/US2008/064219 dated Sep. 30, 2008, 7 pages.

*Primary Examiner* — Edwin A Young (74) *Attorney, Agent, or Firm* — Harness, Dickey & Pierce, P.L.C.

(57) ABSTRACT

An axle assembly that includes an axle housing assembly, a differential disposed in the axle housing assembly, an input pinion, a pair of axle shafts and a heat sink. The input pinion is coupled to the axle housing assembly and is configured to transmit a rotary input to the differential. The axle shafts are coupled to the differential and housed in the axle housing assembly. The heat sink is coupled to the axle housing assembly and is formed of a material having a thermal conductivity that is greater than that of the axle housing assembly. The heat sink does not consist entirely of a chrome plating, a zinc plating or a cadmium plating.

20 Claims, 5 Drawing Sheets

_Fig-1_

_Fig-2_

VEHICLE DRIVELINE COMPONENT HAVING HEAT SINK FOR INCREASED HEAT REJECTION CAPABILITIES

CROSS-REFERENCE TO RELATED APPLICATIONS

This application is a continuation-in-part of U.S. patent application Ser. No. 11/764,444 filed on Jun. 18, 2007. The entire disclosure of the above application is incorporated herein by reference.

FIELD

The present invention generally relates to vehicle driveline components and more particularly to a vehicle driveline component, such as an axle assembly, having a heat sink that is configured to improve the rejection of heat from the vehicle driveline component.

Modernly, vehicle consumers have expressed a desire for vehicles having larger payloads and greater towing capacities. Given these parameters, it is desirable that such axle assemblies be capable of rejecting a sufficient quantity of heat to protect the lubricants within the axle assembly, as well as the seals and the power transmitting components of the axle assembly. It will be appreciated that the life of such lubricants, seals and components can be significantly shortened by exposure to elevated temperatures.

Accordingly, there remains a need in the art for an axle assembly having improved heat rejection capabilities.

SUMMARY

In one form, the teachings of the present disclosure provide an axle assembly that includes an axle housing assembly, a differential disposed in the axle housing assembly, an input pinion, a pair of axle shafts and a heat sink. The input pinion is coupled to the axle housing assembly and is configured to transmit a rotary input to the differential. The axle shafts are coupled to the differential and housed in the axle housing assembly. The heat sink is coupled to the axle housing assembly and is formed of a material having a thermal conductivity of at least about 1.00 W/cm ° K. The heat sink does not consist entirely of a chrome plating, a zinc plating or a cadmium plating.

In another form, the teachings of the present disclosure provide an axle assembly that includes an axle housing, a differential, an input pinion, a pair of axle shafts and a cover. The axle housing defines an aperture into which the differential is received. The input pinion is coupled to the axle housing and is configured to transmit a rotary input to the differential. The axle shafts are coupled to the differential. The differential transmits rotary power from the input pinion to the axle shafts. The cover closes the aperture in the axle housing and has a first layer, which is formed of a ferrous material, and a second layer that is formed of another material having a thermal conductivity that is greater than about 1.30 W/cm ° K. The first and second layers are in thermal communication to transmit heat therebetween.

In yet another form, the teachings of the present disclosure provide an axle cover for an axle assembly. The axle cover includes a first member and a second member. The first member has a body portion and a flange portion that is disposed about a perimeter of the body portion. The body portion has a three-dimensionally contoured surface. The flange portion is configured to be coupled to an axle housing. The first member is formed of a first material having a first thermal conductivity. The second member is formed of a second material having a second thermal conductivity that is greater than the first thermal conductivity. The second member being coupled to the body of the first member. The second member does not consist entirely of a chrome plating, a zinc plating or a cadmium plating.

In yet another form, the teachings of the present disclosure provide an axle assembly that includes an axle housing, a differential, an input pinion, a pair of axle shafts and a cover. The axle housing defines a cavity in which the differential is received. The input pinion is coupled to the axle housing and is configured to transmit a rotary input to the differential. The axle shafts are coupled to the differential. The differential transmits rotary power from the input pinion to the axle shafts. The cover encloses the cavity in the axle housing. The axle housing has a first layer, which is formed of a ferrous material, and a second layer that is formed of another material having a thermal conductivity that is greater than about 1.30 W/cm ° K. The first and second layers are in thermal communication to transmit heat therebetween. The first layer includes an interior surface and an exterior surface. The second layer is arranged upon the first layer to encase a majority of the interior or exterior surface to form a heat sink.

In yet another form, the teachings of the present disclosure provide an axle assembly that includes an axle housing, a differential, an input pinion and a pair of axle shafts. The axle housing includes a carrier housing and a pair of axle tubes. The carrier housing defines a cavity in which the differential is received. The input pinion is coupled to the axle housing and is configured to transmit a rotary input to the differential. The axle shafts are coupled to the differential. The differential transmits rotary power from the input pinion to the axle shafts. The carrier housing has a first layer, which is formed of a ferrous material, and a second layer that is formed of another material having a thermal conductivity that is greater than about 1.30 W/cm ° K. The first and second layers are in thermal communication to transmit heat therebetween. The first layer includes an interior surface and an exterior surface. The second layer is arranged upon the first layer to encase a majority of the interior or exterior surface to form a heat sink.

In yet another form, the teachings of the present disclosure provide an axle assembly that includes an axle housing, a differential, an input pinion and a pair of axle shafts. The axle housing includes a carrier housing and a pair of axle tubes. The carrier housing defines a cavity in which the differential is received. The input pinion is coupled to the axle housing and is configured to transmit a rotary input to the differential. The axle shafts are coupled to the differential. The differential transmits rotary power from the input pinion to the axle shafts. Each of the axle tubes has a first layer, which is formed of a ferrous material, and a second layer that is formed of another material having a thermal conductivity that is greater than about 1.30 W/cm ° K. The first and second layers are in thermal communication to transmit heat therebetween. The first layer includes an interior surface and an exterior surface. The second layer is arranged upon the first layer to encase a majority of the interior or exterior surface to form a heat sink.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION

Figure 1:
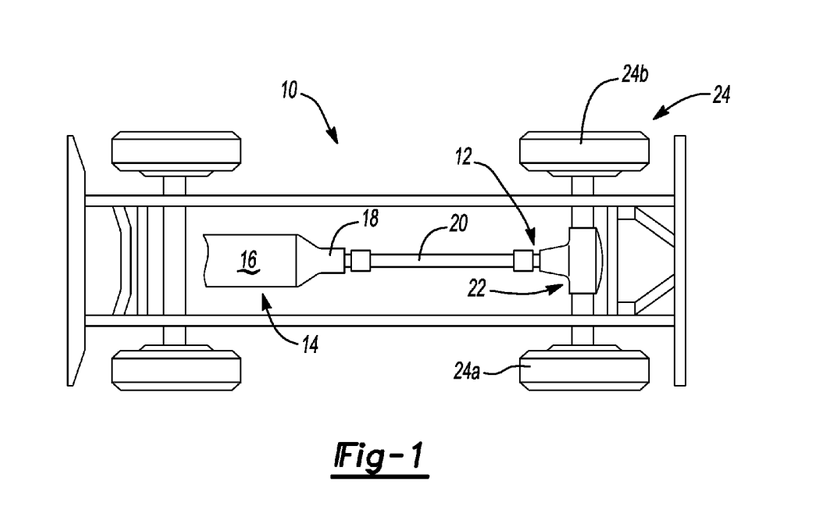
FIG. 1 is a schematic illustration of a vehicle having a rear axle constructed in accordance with the teachings of the present disclosure.

With reference to FIG. 1 of the drawings, a vehicle having a differential assembly that is constructed in accordance with the teachings of the present disclosure is generally indicated by reference numeral 10. The vehicle 10 can include a driveline 12 that is drivable via a connection to a power train 14. The power train 14 can include an engine 16 and a transmission 18. The driveline 12 can include a propshaft 20, a rear axle 22 and a plurality of wheels 24. The engine 16 can be mounted in an in-line or longitudinal orientation along the axis of the vehicle 10 and its output can be selectively coupled via a conventional clutch to the input of the transmission 18 to transmit rotary power (i.e., drive torque) therebetween. The input of the transmission 18 can be commonly aligned with the output of the engine 16 for rotation about a rotary axis. The transmission 18 can also include an output and a gear reduction unit. The gear reduction unit can be operable for coupling the transmission input to the transmission output at a predetermined gear speed ratio. The propshaft 20 can be coupled for rotation with the output of the transmission 18.

Drive torque can be transmitted through the propshaft 20 to the rear axle 22 where it can be selectively apportioned in a predetermined manner to the left and right rear wheels 24a and 24b, respectively.

Figure 2:
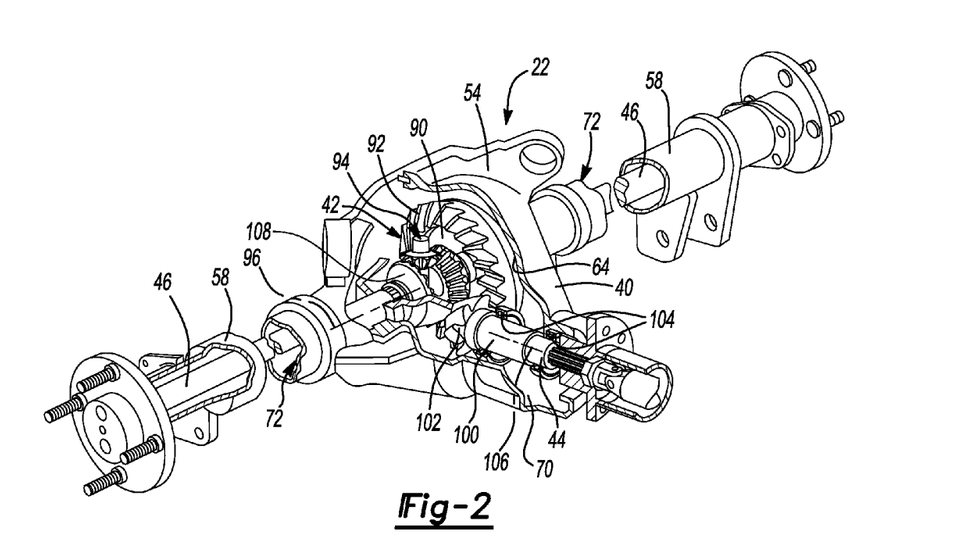
FIG. 2 is a partially broken-away perspective view of a portion of the vehicle of FIG. 1 illustrating the rear axle in more detail.
Figure 3:
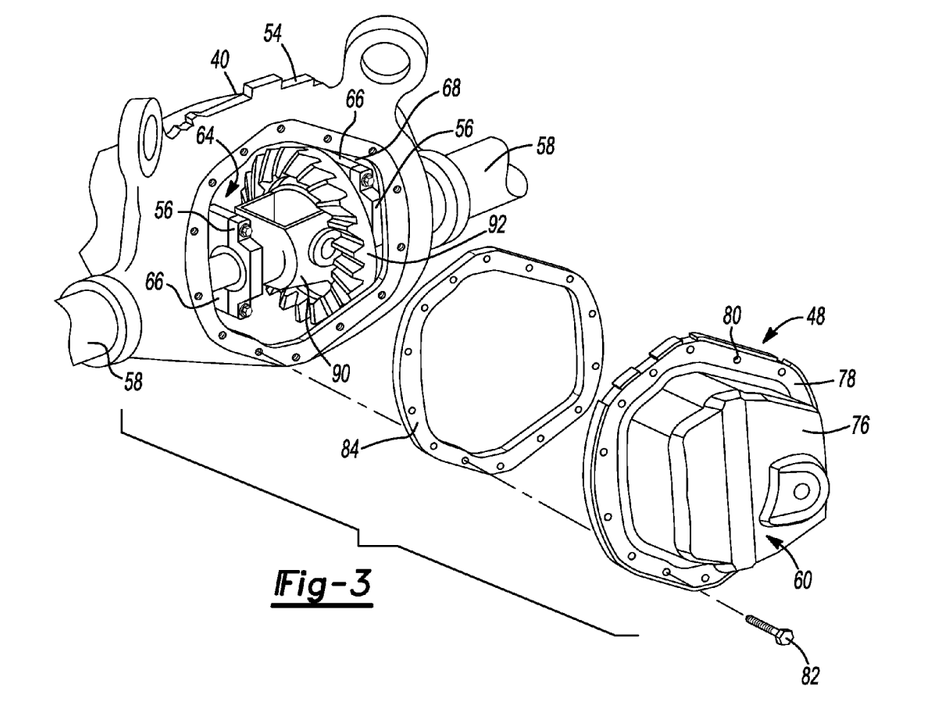
FIG. 3 is an exploded perspective view of the rear of the rear axle of FIG. 1.
Figure 4:
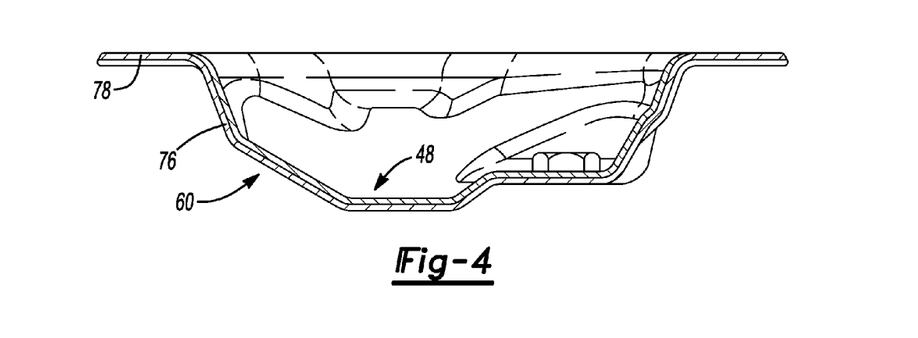
FIG. 4 is a cross-sectional view taken through a portion of the rear axle, illustrating the cover and the heat sink in more detail.

With reference to FIGS. 2 through 4, the rear axle 22 can include an axle housing assembly 40, a differential 42, an input pinion assembly 44, a pair of axle shafts 46, and a heat sink 48.

In the particular example illustrated in FIGS. 2 through 4, the axle housing assembly 40 includes a carrier housing 54, a pair of bearing caps 56, a pair of axle tubes 58 and a cover 60. The carrier housing 54 can define an internal cavity 64, a pair of bearing journals 66, a differential aperture 68, which can intersect the internal cavity 64 from a first side of the carrier housing 54, a pinion aperture 70, which can intersect the internal cavity from a second side of the carrier housing 54 opposite the differential aperture 68, and a pair of axle tube apertures 72 that can intersect the opposite lateral sides of the internal cavity 64. The bearing caps 56 can be removably coupled to the bearing journals 66. The axle tubes 58 can be received in the axle tube apertures 72 and can be fixedly coupled to the carrier housing 54. The cover 60 can include a body portion 76 and a flange portion 78 that can be coupled to the carrier housing 54 to enclose the internal cavity 64. The body portion 76 can be three-dimensionally contoured (e.g., bulged outwardly) to effectively increase the volume within the differential axle housing assembly 40. The flange portion 78 can extend about the body portion 76 and in the particular example provided, includes a plurality of through holes 80 that permit the cover 60 to be removably coupled to the carrier housing 54 (via a plurality of threaded fasteners 82). It will be appreciated that a gasket 84 or a sealant (not shown), such as PERMATEX®, can be employed to seal the interface between the cover 60 and the carrier housing 54.

The differential 42 can be any appropriate vehicle differential and can conventionally include a case 90, a ring gear 92, which can be coupled to the case 90, and a gearset 94 that can be housed in the case 90. The differential 42 can be received into the internal cavity 64 through the differential aperture 68. The bearing journals 66 and the bearing caps 56 can cooperate to support the differential 42 for rotation in the internal cavity 64 about a first rotational axis 96.

The input pinion assembly 44 can conventionally include an input shaft 100 and an input pinion 102 that can be coupled for rotation with the input shaft 100. The input pinion assembly 44 can be received into the carrier housing 54 through the pinion aperture 70 such that the input pinion 102 is meshingly engaged to the ring gear 92. A pair of bearings 104 can be coupled to the carrier housing 54 and the input shaft 100 and can support the input pinion assembly 44 for rotation about a second rotational axis 106 that can be generally perpendicular to the first rotational axis 96. An end of the input shaft 100 opposite the input pinion 102 can be adapted to be coupled to a driveline component, such as the propshaft 20 (FIG. 1), to receive rotary power therefrom.

Each of the axle shafts 46 can be received through an associated one of the axle tubes 58 and can be coupled for rotation with an associated side gear 108 in the gearset 94 of the differential 42. Accordingly, it will be appreciated that rotary power input to the axle 22 via the input pinion assembly 44 is transmitted through the ring gear 92, to the case 90 and the gearset 94 and output to the axle shafts 46 to provide propulsive power to the left and right rear wheels 24a and 24b (FIG. 1).

Figure 5:
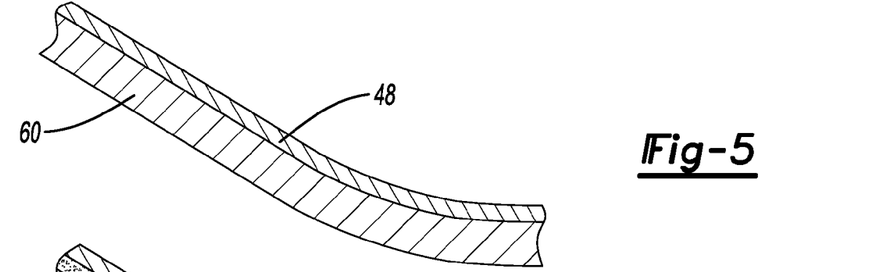
FIG. 5 is an enlarged portion of the sectional view of FIG. 4.
Figure 6:
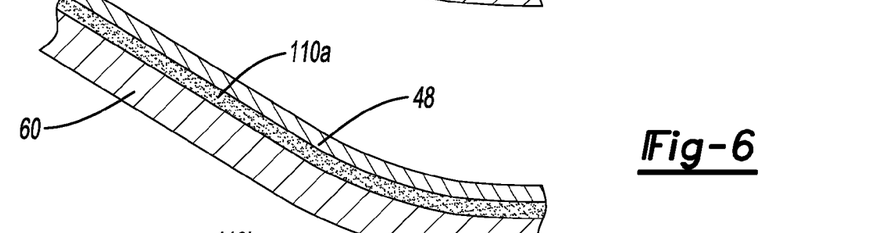
FIG. 6 is a portion of a cross-sectional view similar to that of FIG. 5 but illustrating the heat sink as coupled to the cover via an adhesive.
Figure 7:
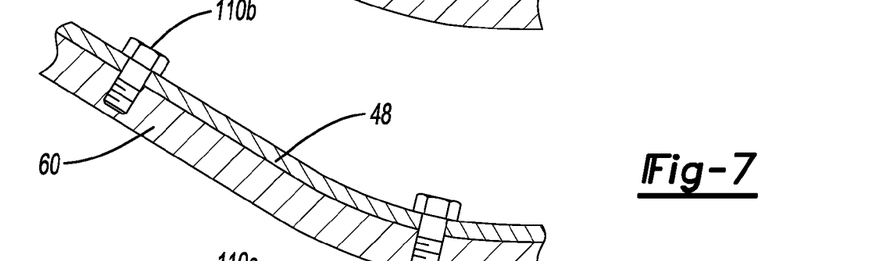
FIG. 7 is a portion of a cross-sectional view similar to that of FIG. 5 but illustrating the heat sink as coupled to the cover via threaded fasteners.
Figure 8:
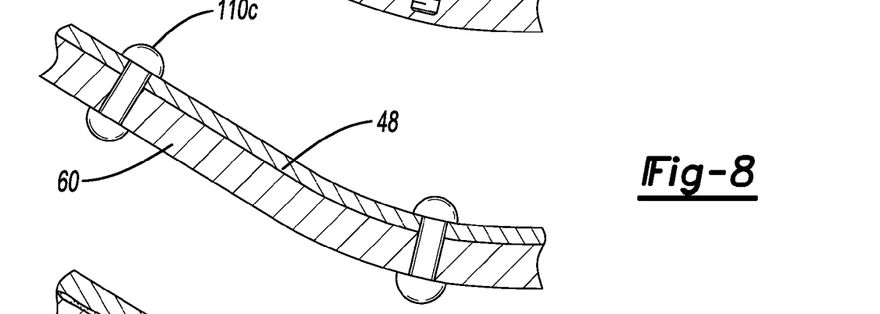
FIG. 8 is a portion of a cross-sectional view similar to that of FIG. 5 but illustrating the heat sink as coupled to the cover via rivets.
Figure 9:
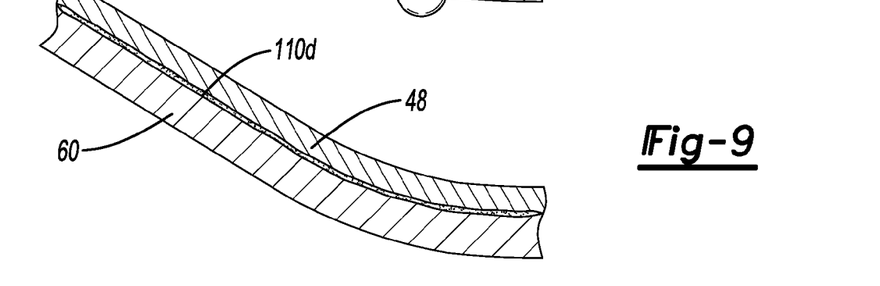
FIG. 9 is a portion of a cross-sectional view similar to that of FIG. 5 but illustrating the heat sink as coupled to the cover via a brazing compound.

With reference to FIGS. 3 through 5, the heat sink 48 can be coupled to a member of the axle housing assembly 40, such as the cover 60, and can be employed to aid in the rejection of heat from the axle housing assembly 40. The heat sink 48 can be formed onto the cover 60 in any appropriate manner, such as plating or dipping, or can be a discrete and separately formed structure that can be secured to the cover 60 through any appropriate means, such as thermally conductive adhesives 110a (FIG. 6), threaded fasteners 110b (FIG. 7), rivets 110c (FIG. 8), solder or brazing compound 110d (FIG. 9) and combinations thereof.

Generally, the cover 60 (or other portion of the axle housing assembly 40 to which the heat sink 48 is coupled) can be formed of a first material and the heat sink 48 can be formed of a second material having a thermal conductivity that is greater than a thermal conductivity of the first material. However, the heat sink 48 does not consist entirely of a chrome plating, a zinc plating or a cadmium plating. Non-limiting examples of suitable first and second materials are shown in the following table.

| First Material | Thermal Conductivity | Second Material | Thermal Conductivity |
|---|---|---|---|
| Steel | 0.45-0.65 W/cm ° K | Aluminum | 2.37 W/cm ° K |
|  |  | Copper | 4.01 W/cm ° K |
|  |  | Magnesium | 1.56 W/cm ° K |
| Cast Iron | 0.76 W/cm ° K | Aluminum | 2.37 W/cm ° K |
|  |  | Copper | 4.01 W/cm ° K |
|  |  | Magnesium | 1.56 W/cm ° K |
| Aluminum | 2.37 W/cm ° K | Copper | 4.01 W/cm ° K |

Preferably, the second material has a thermal conductivity that is greater than about 1.30 W/cm ° K if the first material is a ferrous material.

Figure 10:
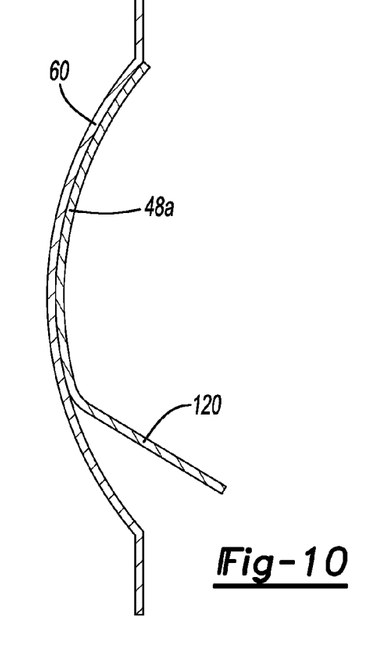
FIG. 10 is a sectional view of a portion of another axle constructed in accordance with the teachings of the present disclosure, the axle having a heat sink having fingers that extend into the internal cavity of the carrier housing.
Figure 11:
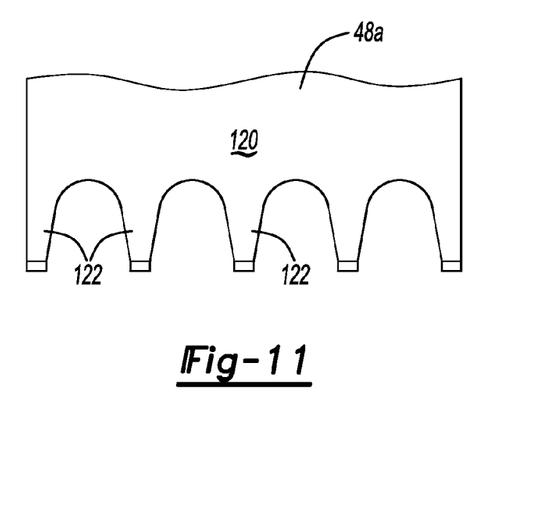
FIG. 11 is a front view of a portion of the axle of FIG. 10 illustrating the fingers of the heat sink in more detail.

In the example provided, the heat sink 48 co-extends with a portion of the cover 60 (e.g., the body portion 76). It will be appreciated, however, that a portion of the heat sink 48 could diverge from the portion of the axle housing assembly 40 to which the heat sink 48 is coupled. For example, the heat sink 48a could include an outwardly flared portion 120 as illustrated in FIGS. 10 and 11. In this example, the outwardly flared portion 120 includes a plurality of fingers 122 that are received into the internal cavity 64 in the carrier housing 54 where they are submerged in a lubricating oil (not shown). The fingers 122 can facilitate the rejection of heat from the sump in which the lubricating oil is disposed.

Figure 12:
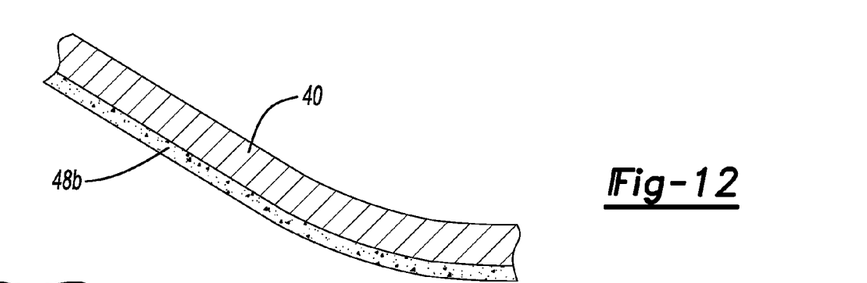
FIG. 12 is a cross-sectional view similar to that of FIG. 5 but illustrating the heat sink as coupled to the exterior of the cover.
Figure 13:
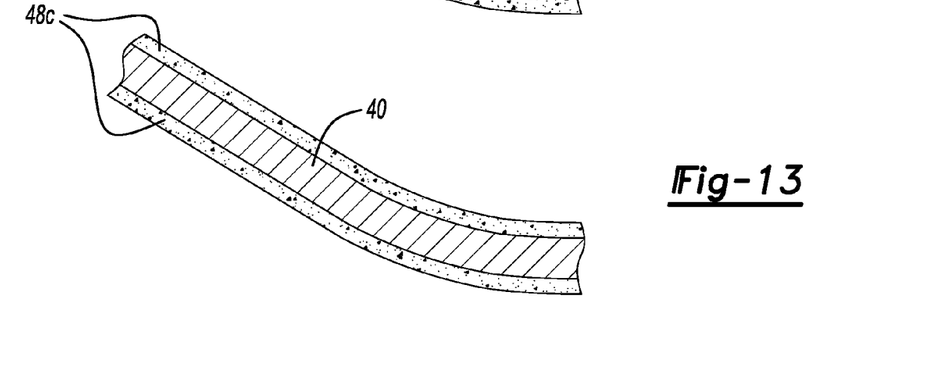
FIG. 13 is a cross-sectional view similar to that of FIG. 5, but illustrating the heat sink as coupled to the interior and the exterior of the cover.

It will be appreciated that while the heat sink 48 has been illustrated and described thus far as being located within the axle housing assembly 40, the disclosure, in its broadest aspects, may be constructed somewhat differently. For example, the heat sink 48b can be coupled to the exterior of the axle housing assembly 40 as illustrated in FIG. 12, or the heat sink 48c could be coupled to both the interior and exterior of the axle housing assembly 40 as illustrated in FIG. 13. To the extent that the heat sink is disposed on the exterior of the axle housing assembly 40, the heat sink can include portions, such as fingers, that can be exposed to air currents when a vehicle (not shown) that employs the rear axle 22 is operated. Such portions of the heat sink could be formed to minimize drag, or could be formed to deflect air against the axle housing assembly 40 to increase the convection cooling of the rear axle 22.

While the rear axle 22 has been illustrated and described as being a Salisbury-type axle, it will be appreciated that the disclosure, in its broadest aspects, need not be limited to any particular type of axle. For example, the rear axle 22 could be a banjo-type axle and the heat sink 48 could be coupled to a rear cover (not shown) that is fixedly and non-removably coupled to a remainder of the axle housing (not shown) via welding. Moreover, it will be appreciated that the teachings of the present disclosure need not be limited to rear axles but could be utilized in any type of axle or driveline component, including differentials, viscous couplings, and transfer cases.

Figure 14:
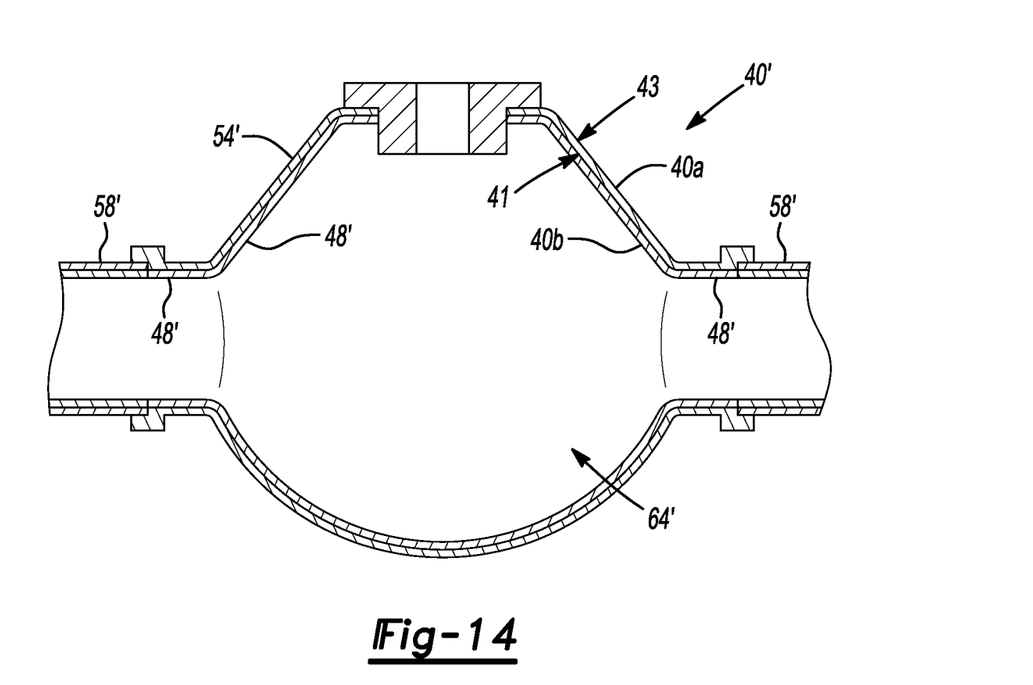
FIG. 14 is a schematic illustration of a cross-sectional view of an exemplary rear axle constructed in accordance with the teachings of the present disclosure.
Figure 15:
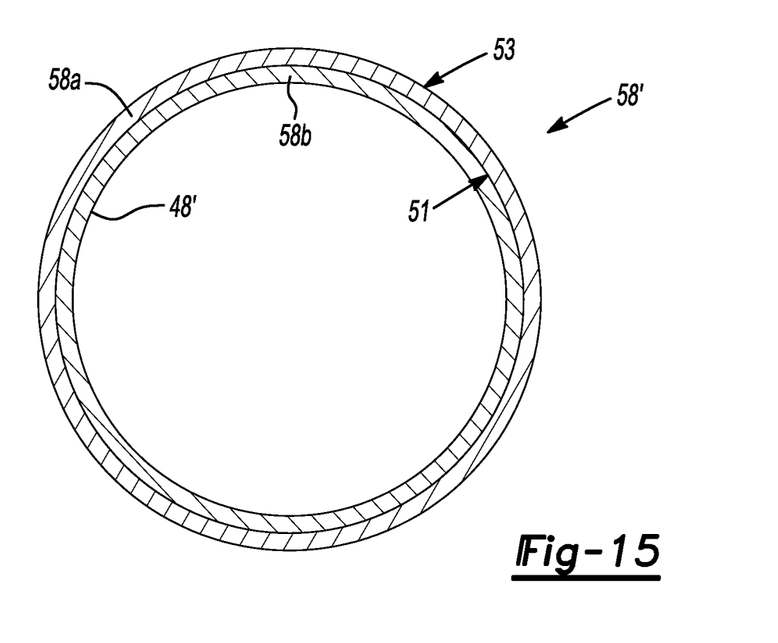
FIG. 15 is a cross-sectional view of an exemplary axle tube constructed in accordance with the teachings of the present disclosure.

With reference to FIGS. 14 and 15, a banjo-type axle housing 40' according to the present disclosure is illustrated. Axle housing 40' can be identical to axle housing 40, except for the differences noted below, and can be utilized with some or all of the components of rear axle 22 described above, e.g., differential 42, input pinion 44 and the pair of axle shafts 46.

Axle housing 40' can include a carrier housing 54' and a pair of axle tubes 58' that are fixedly coupled to the carrier housing 54' by, e.g., welding or similar process. In some embodiments, the carrier housing 54' and axle tubes 58' can be monolithically formed. The carrier housing 54' can define a cavity 64' in which differential 42 can be arranged. An input pinion 44 can be coupled to the carrier housing 54'. Input pinion 44 can be utilized to transmit power, such as a rotary input, to the differential 42. A pair of axle shafts 46 can be coupled to the differential 42 and arranged within the pair of axle tubes 58'. The differential 42 can transmit rotary power from the input pinion 44 to the axle shafts 46.

A heat sink 48' can be coupled to the axle housing 40' to aid in the rejection of heat. Heat sink 48' can be similar to heat sink 48 described above and can be formed onto the axle housing 40' or portion thereof in any appropriate manner, such as by plating or dipping, or can be a discrete and separately formed structure that can be secured to the axle housing 40' through any appropriate means, such as thermally conductive adhesives 110a (FIG. 6), threaded fasteners 110b (FIG. 7), rivets 110c (FIG. 8), solder or brazing compound 110d (FIG. 9) and combinations thereof. In various embodiments, axle housing 40' can be formed of a first material and the heat sink 48' can be formed of a second material having a thermal conductivity that is greater than the thermal conductivity of the of the first material, as is described above in relation to heat sink 48.

Axle housing 40' can include a first layer 40a having an interior surface 41 and an exterior surface 43. Axle housing 40' can further include a second layer 40b arranged upon, but not passing through, the first layer 40a to form heat sink 48'. The second layer 40b can be arranged upon the interior surface 41 (as shown in FIG. 14) and/or the exterior surface 43 of the first layer 40a. Rather than being limited to a small area or a portion of the axle housing 40', the second layer 40b can encase a majority (≥50%) of the interior surface 41 and/or exterior surface 43 of the first layer 40a to form a heat sink 48'. In some embodiments, the second layer 40b can encase substantially all (approximately 80% or more) of interior surface 41/exterior surface 43. For example only, the second layer 40b can encase more than 90% of the surface area of interior surface 41/exterior surface 43.

In some embodiments, heat sink 48' can be coupled to, and encase the majority of the interior/exterior surface of, carrier housing 54'. In this example, heat sink 48' may be absent from, or be limited to a small area of, axle tubes 58'. In various other embodiments, heat sink 48' can be coupled to, and encase the majority of the interior/exterior surface of, axle tubes 58' (described below), while being absent from, or limited to a small area of, carrier housing 54'. Finally, in some embodiments heat sink 48' can be coupled to, and encase the majority of the interior/exterior surfaces of, both carrier housing 54' and axle tubes 58'.

Referring now to FIG. 15, exemplary axle tube 58' can include heat sink 48'. In various embodiments, axle tube 58' can be formed of a first material and the heat sink 48' can be formed of a second material having a thermal conductivity that is greater than the thermal conductivity of the of the first material, as is described above in relation to heat sink 48.

Axle tube 58' can include a first layer 58a having an interior surface 51 and an exterior surface 53. Axle tube 58' can further include a second layer 58b arranged upon, but not passing through, the first layer 58a to form heat sink 48'. The second layer 58b can be arranged upon the interior surface 51 (as shown in FIG. 15) and/or the exterior surface 53 of the first layer 58a. Rather than being limited to a small area or a portion of the axle tube 58', the second layer 50b can encase a majority (≥50%) of the interior surface 51 and/or exterior surface 53 of the first layer 58a to form a heat sink 48'. In some embodiments, the second layer 58b can encase substantially all (approximately 80% or more) of interior surface 51/exterior surface 53. For example only, the second layer 58b can encase more than 90% of the surface area of interior surface 51/exterior surface 53.

While FIGS. 14 and 15 and their associated description relate to a banjo-type axle housing 40', it will be appreciated that the disclosure, in its broadest aspects, need not be limited to any particular type of axle. For example only, heat sink 48 may be constructed similarly to heat sink 48'. That is, heat sink 48 can be constructed to be coupled to, and encase the majority, or substantially all, of the interior/exterior surface of axle housing 40, including carrier housing 54 and/or axle tubes 58, as well as cover 60 described above.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. An axle assembly comprising:
an axle housing that defines a cavity, the axle housing having a first layer that is formed of a ferrous material and a second layer that is formed of another material having a thermal conductivity that is greater than about 1.30 W/cm ° K, the first and second layers being in thermal communication to transmit heat therebetween, the first layer including an interior surface and an exterior surface, the second layer not passing through the first layer and being arranged upon the first layer to encase a majority of the interior surface or the exterior surface to form a heat sink;
a differential received in the cavity in the axle housing;
an input pinion coupled to the axle housing and adapted to transmit a rotary input to the differential;
a pair of axle shafts coupled to the differential, the differential transmitting rotary power from the input pinion to the axle shafts; and
a cover coupled to the axle housing to enclose the cavity in the axle housing.

2. The axle assembly of claim 1, wherein the another material is selected from a group consisting of aluminum, copper, magnesium and combinations thereof.

3. The axle assembly of claim 1, wherein the second layer is a discrete member that is secured to the first layer.

4. The axle assembly of claim 3, wherein the second layer is coupled to the first layer with a thermally conductive adhesive.

5. The axle assembly of claim 3, wherein a layer of braze compound or solder compound secures the second layer to the first layer.

6. The axle assembly of claim 3, wherein a plurality of threaded fasteners secure the second layer to the first layer.

7. The axle assembly of claim 3, wherein a portion of the second layer extends outwardly from the first layer so as to be separated therefrom by a space.

8. The axle assembly of claim 1, wherein the second layer encases at least 90% of the interior surface or the exterior surface.

9. The axle assembly of claim 1, wherein the axle housing includes a carrier housing and a pair of axle tubes, the carrier housing and the cover defining the cavity and the pair of axle shafts being arranged within the pair of axle tubes.

10. An axle assembly comprising:
an axle housing that includes a carrier housing and a pair of axle tubes, the carrier housing defining a cavity and having a first layer that is formed of a ferrous material and a second layer that is formed of another material having a thermal conductivity that is greater than about 1.30 W/cm ° K, the first and second layers being in thermal communication to transmit heat therebetween, the first layer including an interior surface and an exterior surface, the second layer not passing through the first layer and being arranged upon the first layer to encase a majority of the interior surface or the exterior surface to form a heat sink;
a differential received in the cavity in the axle housing;
an input pinion coupled to the axle housing and adapted to transmit a rotary input to the differential; and
a pair of axle shafts arranged within the pair of axle tubes and coupled to the differential, the differential transmitting rotary power from the input pinion to the axle shafts.

11. The axle assembly of claim 10, wherein the another material is selected from a group consisting of aluminum, copper, magnesium and combinations thereof.

12. The axle assembly of claim 10, wherein the second layer is a discrete member that is secured to the first layer.

13. The axle assembly of claim 10, wherein the second layer encases substantially all of the interior surface or the exterior surface.

14. The axle assembly of claim 10, wherein the second layer encases at least 90% of the interior surface or the exterior surface.

15. The axle assembly of claim 10, wherein the axle housing is a banjo-type axle housing.

16. The axle assembly of claim 10, wherein the pair of axle tubes have a third layer that is formed of a ferrous material and a fourth layer that is formed of another material having a thermal conductivity that is greater than about 1.30 W/cm ° K, the third and fourth layers being in thermal communication to transmit heat therebetween, the third layer including a second interior surface and a second exterior surface, the fourth layer not passing through the third layer and being arranged upon the third layer to encase substantially all of the second interior surface or the second exterior surface to form a heat sink.

17. An axle assembly comprising:
an axle housing that includes a carrier housing and a pair of axle tubes, the carrier housing defining a cavity and each of the pair of axle tubes having a first layer that is formed of a ferrous material and a second layer that is formed of another material having a thermal conductivity that is greater than about 1.30 W/cm ° K, the first and second layers being in thermal communication to transmit heat therebetween, the first layer including an interior surface and an exterior surface, the second layer not passing through the first layer and being arranged upon the first layer to encase substantially all of the interior surface or the exterior surface to form a heat sink;

a differential received in the cavity in the axle housing;

an input pinion coupled to the axle housing and adapted to transmit a rotary input to the differential; and a pair of axle shafts arranged within the pair of axle tubes and coupled to the differential, the differential transmitting rotary power from the input pinion to the axle shafts.

18. The axle assembly of claim 17, wherein the another material is selected from a group consisting of aluminum, copper, magnesium and combinations thereof.

19. The axle assembly of claim 17, wherein the second layer is a discrete member that is secured to the first layer.

20. The axle assembly of claim 17, wherein the second layer encases at least 90% of the interior surface or the exterior surface.

* * * * *